(12) United States Patent
Hoffjann et al.

(10) Patent No.: US 9,897,041 B2
(45) Date of Patent: Feb. 20, 2018

(54) ENGINE FOR PROPELLING AN AIRCRAFT AND AIRCRAFT HAVING AT LEAST ONE ENGINE AND AT LEAST ONE HYDROGEN TANK

(71) Applicants: Airbus Operations GmbH, Hamburg (DE); Airbus Defence and Space GmbH, Ottobrunn (DE)

(72) Inventors: Claus Hoffjann, Hamburg (DE); Christian Wolff, Ottobrunn (DE)

(73) Assignees: Airbus Operations GmbH (DE); Airbus Defence and Space GmbH (DE)

( * ) Notice: Subject to any disclaimer, the term of this patent is extended or adjusted under 35 U.S.C. 154(b) by 201 days.

(21) Appl. No.: 14/549,730

(22) Filed: Nov. 21, 2014

(65) Prior Publication Data
US 2015/0308383 A1 Oct. 29, 2015

(30) Foreign Application Priority Data

Nov. 27, 2013 (EP) ..................................... 13194653

(51) Int. Cl.
*F02K 7/08* (2006.01)
*B64D 27/24* (2006.01)
(Continued)

(52) U.S. Cl.
CPC ................ *F02K 7/08* (2013.01); *B64D 27/24* (2013.01); *F01D 15/10* (2013.01); *F02C 7/32* (2013.01); *F02K 3/025* (2013.01); *F02K 3/06* (2013.01); *F02K 7/10* (2013.01); *H01M 8/1018* (2013.01); *H01M 8/24* (2013.01); *B64D 2041/005* (2013.01); *F05D 2220/10* (2013.01); *F05D 2220/76* (2013.01); *H01M 8/04014* (2013.01);
(Continued)

(58) Field of Classification Search
CPC ... F02K 7/08; F01D 15/10; F02C 7/32; B64D 2041/005; Y02E 60/50
See application file for complete search history.

(56) References Cited

U.S. PATENT DOCUMENTS 5,360,679 A * 11/1994 Buswell .............. H01M 8/0612
429/414
6,082,670 A * 7/2000 Chapman .................. B63B 1/32
244/55

(Continued)

FOREIGN PATENT DOCUMENTS

DE 10 2011 018 448 A1 10/2012

*Primary Examiner* — Pascal M Bui Pho
*Assistant Examiner* — Thuyhang Nguyen
(74) *Attorney, Agent, or Firm* — Lerner, David, Littenberg, Krumholz & Mentlik, LLP

(57) ABSTRACT

An engine for propelling an aircraft includes an annular fuel cell arrangement having at least one fuel cell, at least one electric motor couplable to the fuel cell arrangement, at least one fan couplable to the electric motor and a cowling having an inlet and an outlet nozzle. The fuel cell arrangement is arranged inside the cowling, the at least one fan is arranged between the inlet and the fuel cell arrangement inside the cowling, the electric motor is operable under consumption of electric power delivered by the fuel cell arrangement and the at least one fan is designed to produce a thrust force by creating an accelerated airflow at the outlet nozzle. The engine is extremely efficient and comprises a distinct low noise.

16 Claims, 6 Drawing Sheets

(51) Int. Cl.
*F01D 15/10* (2006.01)
*F02K 3/02* (2006.01)
*F02K 3/06* (2006.01)
*F02C 7/32* (2006.01)
*F02K 7/10* (2006.01)
H01M 8/24 (2016.01)
H01M 8/04014 (2016.01)
*H01M 8/04089* (2016.01)
*H01M 8/04082* (2016.01)
*B64D 41/00* (2006.01)
*H01M 8/1018* (2016.01)

(52) U.S. Cl.
CPC .... *H01M 8/04097* (2013.01); *H01M 8/04201* (2013.01); *H01M 2008/1095* (2013.01); *H01M 2250/20* (2013.01); *H01M 2300/0082* (2013.01); *Y02E 60/50* (2013.01); *Y02T 50/44* (2013.01); *Y02T 50/64* (2013.01); *Y02T 90/32* (2013.01); *Y02T 90/36* (2013.01)

(56) References Cited

U.S. PATENT DOCUMENTS

| | | | | |
|---|---|---|---|---|
| 6,428,918 | B1* | 8/2002 | Fuglevand | H01M 8/04007 320/101 |
| 7,028,795 | B2* | 4/2006 | Tabata | B60K 6/365 180/65.21 |
| 7,858,252 | B2* | 12/2010 | Sennoun | H01M 8/04089 429/400 |
| 2002/0098394 | A1* | 7/2002 | Keefer | B01D 53/047 423/651 |
| 2004/0040312 | A1* | 3/2004 | Hoffjann | B01D 53/02 60/784 |
| 2007/0126292 | A1* | 6/2007 | Lugg | F01D 5/03 310/11 |
| 2008/0001038 | A1* | 1/2008 | Daggett | B64D 27/02 244/53 R |
| 2009/0293494 | A1* | 12/2009 | Hoffjann | B64D 27/02 60/780 |

* cited by examiner

ENGINE FOR PROPELLING AN AIRCRAFT AND AIRCRAFT HAVING AT LEAST ONE ENGINE AND AT LEAST ONE HYDROGEN TANK

FIELD OF THE INVENTION

The invention relates to an engine for propelling an aircraft as well as an aircraft having at least one such engine and at least one hydrogen tank.

BACKGROUND OF THE INVENTION

The use of fuel cells in vehicles for providing a plurality of different tasks, such as supplying electrical energy, water, nitrogen-enriched air and heat is a known approach to provide an improved fuel efficiency, reduced emissions and a decreased noise emanation. Especially, the use of fuel cells in aircraft has a great potential for clearly reducing the fuel consumption and emissions and in replacing auxiliary power units based on gas turbine engines.

Hybrid gas turbine engines that are a combination of common gas turbine engines and fuel cell devices are a further approach to increase the overall efficiency of the power supply to an aircraft by integrating solid oxide fuel cell units directly into a gas turbine engine in or at a combustion chamber of the gas turbine. For example, DE 10 2011 018 448 A1 discloses a hybrid gas turbine engine with solid oxide fuel cell units that are located upstream of a combustion chamber of a gas turbine and are supplied with a hydrocarbon gas turbine fuel directly reformed inside the fuel cell units. The operation of these solid oxide fuel cell units thereby depends on the operation of the gas turbine engine and is mainly focused on the supply of electrical energy.

BRIEF SUMMARY OF THE INVENTION

An aspect of the invention may provide an improved engine for propelling an aircraft in a fuel economic way.

An engine for propelling an aircraft is proposed. An engine according to an embodiment of the invention comprises a fuel cell arrangement having at least one fuel cell, an electric motor couplable to the fuel cell arrangement, at least one fan couplable to the electric motor and a cowling having an inlet and an outlet nozzle, wherein the fuel cell arrangement is positioned inside the cowling, wherein the at least one fan is arranged between the inlet and the fuel cell arrangement in the cowling, wherein the electric motor is operable under consumption of electric power delivered by the fuel cell arrangement and wherein the at least one fan is designed to produce a thrust force by creating an accelerated airflow at the outlet nozzle.

The fuel cell arrangement preferably is annular, i.e. it comprises a ring shape or at least partially coincides with a ring shape, which is preferably adjusted to the outermost diameter of the inner space of the cowling. This leads to an excellent integration of the fuel cell arrangement into the periphery of the cowling without blocking the air flow through the cowling. Further, the operation temperature of the at least one fuel cell in the fuel cell arrangement may be selected independently from any other optional component inside the engine, such that low- and medium- and high temperature PEM fuel cells may be usable. This may include PEM fuel cells with an operating temperature of up to 95° C., 140° C. and 225° C., while these temperatures shall not limit the scope of protection and are mentioned for clarification of the expressions "low", "medium" and "high".

The fuel cell arrangement may comprise one or more fuel cells, comprising a cathode, an anode and an electrolyte separating the cathode from the anode. The anode comprises an inlet for hydrogen as fuel cell fuel, whereas the cathode comprises an air inlet for receiving air as oxidant. In case a plurality of fuel cells is used, the fuel cells may be distanced to each other and distributed in an equidistant manner or with different regular or irregular distances in the fuel cell arrangement. In the following, fuel cell related features and characteristics may also be mentioned when referring to the fuel cell arrangement as a whole.

The cowling is to be understood as a housing, which may be equal to a common cowling of a turbojet engine, which encloses all active components and provides an air inlet and an outlet for the accelerated gas flow.

The electric motor may preferably be a DC motor, as the fuel cell arrangement delivers a direct current. Preferably, the electric motor is brushless and uses a combination of stationary electrical magnets and rotating permanent magnets. A suitable motor controller converts the applied direct current to an alternating current. The advantage lies in the clearly simpler setup compared to AC motors, primarily through elimination of the necessity to transfer power from the outside of the electric motor to the rotor. This is accompanied by a long life span, little or no maintenance, and high efficiency.

The fan may be arranged directly at the air inlet and is adapted to provide an accelerated airflow. For this purpose, the fan comprises a regular arrangement of radial blades that act on air. The engine according to the invention thereby provides an airflow comparable to a common jet engine as it sucks air from the inlet and provides a clearly accelerated airflow at the outlet nozzle. However, the engine according to the invention has some significant distinct features. A primary difference is the lack of a common core engine which uses a fuel for a combustion process inside the engine for driving a turbine connected to a fan.

Besides providing the accelerated airflow at the outlet nozzle, the fan located upstream of the fuel cell arrangement also supplies the fuel cell arrangement with fresh air preferably at a cathode side, depending on the type of the fuel cell. Air for the cathode supply may be routed through a separate air channel, which is connected to a cathode inlet of the fuel cell arrangement. Hence, this air channel may be annular and may be an integral part of the cowling or separately manufactured and installed into the cowling. For example, the air channel may be defined through an inner, air channel delimiting ring or strip having a diameter below the diameter of the inside of the cowling, may be concentrically arranged inside the cowling and, furthermore, may be attached to the inside of the cowling through a plurality of fins that bridge the gap in the air channel. The fins may be used for directing the airflow from the fan to the air inlet of the fuel cell arrangement and for providing a structural stiffening function. It goes without saying that it is mandatory that the air temperature of the incoming airflow meets the requirements of the fuel cell arrangement.

Furthermore, the air flowing to the cathode side of the fuel cell and passing the fuel cell arrangement provides cooling for the fuel cell arrangement. After flowing through the fuel cell arrangement, the air will be heated to the working temperature of the fuel cell arrangement and will be partially depleted from oxygen. Due to cooling the fuel cell arrangement, the air flow will experience a slight pressure drop, which is partially compensated in an energetic view by the increase in temperature. Also, water vapor that is generated during the operation of the fuel cell is discharged through the passing air flow.

The direct fan air is the main propulsion airstream. By eliminating the core engine, the noise and the production of exhaust gases are clearly reduced. Delivering an accelerated flow of air at the outlet nozzle further leads to additionally sucking air through the center of the engine and delivering it to the outlet nozzle thanks to Bernoulli's principle, which clearly increases the mass flow and thereby the thrust force of the engine.

Preferably, in a rigid manner, without using cables, the electric motor is couplable to the fuel cell arrangement. This is rendered more clear in the following description.

As described above, it is further advantageous if the fuel cell arrangement comprises a plurality of fuel cell units being arranged annularly within the cowling. This means that the arrangement is preferably symmetrical and comprises a ring shape or at least partially coincides with a ring shape.

In an advantageous embodiment the electric motor comprises a plurality of coils and a plurality of magnets. As mentioned above, the electric motor may be a DC motor, with the coils being arranged in a stationary position relative to the cowling and the magnets being arranged at the rotating fan. In other words, the coils are preferably arranged at a diameter of the inside of the cowling, which is directly adjacent to the outer diameter of the rotating fan. The magnets are preferably arranged on the outermost diameter of the fan. The resulting setup of the electric motor is mechanically extremely simple and, due to the possible diameter of the electric motor, a very high torque may be realized.

For operating the electric motor, preferably each electrical inverter is coupled with at least one coil, which in turn is coupled with the fuel cell arrangement and is controlled by a control unit. The at least one inverter is designed for providing individual electric voltages to the plurality of coils for moving the magnets relative thereto. Through the control unit, the individual voltages may be adjusted to induce a desired speed of the fan. In this regard, a plurality of individual voltages may be generated, wherein the plurality of coils comprises a plurality of groups of coils, wherein the individual voltages may be delivered to the groups of coils.

It is especially advantageous if the fan itself is the rotor of the electric motor. This means that the magnets constitute an integral part of the fan such that without any mechanical coupling elements, the fan is directly driven through the excitation of the coils surrounding the fan. A suitable dimension of a gap between the fan and the coils should be chosen, such that all temperature ranges occurring during the operation of the engine and the rotational speeds are to be considered.

The engine according to an embodiment of the invention may further comprise a magnetic bearing between the fan and the cowling of the engine in order to support the fan. A magnetic bearing is to be understood as a device that supports the fan only by using magnetic levitation radial and axial to the fan. On top the axial levitation is capable to transfer all thrust loads from the fan to the aircraft. Preferably, the magnetic bearing is realized as an integral function of the motor. This means that a control unit for providing the individual coils with individual voltages may be adapted for compensating any unwanted radial and axial movements of the fan by adjusting the magnetic forces of all coil pairs with coils that are located at opposite sides of the cowling. The magnets and coils of the motor shall be able to deal with all mechanical forces especially thrust and rotation. For the purpose of providing a suitable state variable to the control unit, a gap sensor with associated electronics may constantly measures a gap between the fan and an outer surface enclosing the fan. The control unit of the electric motor then is able to maintain a predetermined gap. Using a magnetic bearing leads to a distinctly low weight and an extremely low friction.

For further improving the engine, the magnets in the fan may be designed as a so-called "Halbach array", which is an arrangement of magnets that augments the magnetic field on one side of the array while canceling the field on the other side. Hence, magnetic fields are avoided where they cannot be of use in the motor.

It may further be advantageous to design the electric motor such that it may be used as a generator during descent of the aircraft, which is provided with thrust by means of the engine according to an embodiment of the invention. For this purpose, it may be necessary to adjust the alignment of the fan blades and to design the control unit for delivering electrical power from the coils to an electrical network of the aircraft. This allows to increase the efficiency of the aircraft even more as the generation of electrical power on board the aircraft can be supported in a flight phase where a thrust force is hardly required.

It is advantageous to attach the inverters in an annular or ring-shaped arrangement between the inlet of the cowling and the fuel cell arrangement, such that inflowing air cools the inverters. Consequently, the fresh air delivered to the fuel cell arrangement may be slightly pre-heated, in order to at least partially compensate extremely low ambient temperatures during cruise flight, in case the engine according to the invention is used for providing thrust to a commercial aircraft. Also, the cooling power for the inverter is hereby maximized.

In an advantageous embodiment, the fuel cell arrangement comprises a plurality of fuel cell units, which in turn may each comprise a single fuel cell or a fuel cell stack. The fuel cell units are operable independent from each other, thereby increasing the reliability of operation of the engine.

Preferably, each fuel cell unit is coupled with a single, associated inverter, thereby constituting a module. A module is to be considered a compact, self-contained unit, wherein the fuel cell unit is preferably directly connected to the inverter, preferably through a plug and associated socket without any connection cables that need to be held in place inside the cowling and add weight to the engine.

In a further advantageous embodiment, the fuel cell arrangement comprises at least one PEM fuel cell. If the fuel cell arrangement consists of a plurality of fuel cell units, these may each comprise at least one PEM fuel cell. Due to the availability and maturity, PEM fuel cells may be selected, in particular low temperature PEM fuel cells. These may be operated through the supply of hydrogen and air in a temperature range between 55° C. and 95° C. Today, an operating temperature of 80° C. may be state-of-the-art.

However, PEM fuel cells may be used in a number of different variants. For example, air cooled open cathode PEM fuel cells would simplify the general setup of the fuel cell arrangement, as air may simply enter the fuel cell through the open cathode. For future membrane technology, a current density of 1.4 $A/cm^2$ may be possible. As an alternative, air cooled closed cathode PEM fuel cells are possible. Fuel cells of this type are capable of delivering at least 2 $A/cm^2$, but require a slightly more complex design for allowing cooling air and cathode air supply. However, closed cathode PEM fuel cells have advantages in humidification and thermal management. Still further, other fuel cell types are e.g. liquid cooled PEM fuel cells, which may deliver a current density of at least 3 A/cm$^2$, or evaporation cooled PEM fuel cells with a current density of at least 2 A/cm$^2$. However, both of the latter need an additional cooling system and are far more complex. Consequently, in an advantageous embodiment, the fuel cell arrangement comprises a plurality of open cathode PEM fuel cells.

In a still further advantageous embodiment, each fuel cell unit comprises a cooling unit, wherein each cooling unit is couplable to a heat sink, wherein the heat sink is arranged downstream of the at least one fan. By constantly supplying ambient air by means of the fan or propeller over the heat sink a constant cooling capacity is achieved and the fuel cell units do not need any external additionally cooling systems. This may be advantageous if the fuel cell is not of an open type.

In a preferred embodiment, the above mentioned heat sink comprises at least one heat pipe. A heat pipe is a tubular device substantially containing a vacuum and a small amount of a fluid, which heat pipe allows a quick and substantially lossless transfer of heat energy from one end of the heat pipe to another end. Through a mechanical connection of a housing of the respective fuel cell unit, which is directly exposed to the heat of the fuel cell unit, with the heat pipe, heat is transferred to the heat sink. In this regard it may be necessary to maintain a certain slope of the heat pipe.

In an advantageous embodiment, the engine comprises an exhaust gas recirculation outlet and a recirculation line, wherein the recirculation line is connected to a fuel cell exhaust gas outlet and the recirculation outlet and wherein the exhaust gas recirculation outlet is arranged upstream of the fuel cell arrangement. Consequently, a certain amount of the water vapor containing exhaust gas is fed back to the inlet side of the engine, which enables a humidity control of the cathode supply air. This is especially advantageous for optimizing the operation of PEM fuel cells. For ideally controlling the humidity inside the PEM fuel cell, sensing devices may be used, which e.g. measure the resistance of the PEM membrane and/or the capacity of an equivalent circuit representing the fuel cell arrangement. The information about the humidity state of the membrane may be fed back to a recirculation valve arrange between the recirculation line and the exhaust gas recirculation outlet or at the exhaust gas recirculation outlet.

In a still further advantageous embodiment, the engine comprises two counter-rotating fans arranged one behind the other in an axial direction. Hence, there is a leading (first) fan and a trailing (second) fan, which rotates in an opposite direction of rotation than the leading fan. This raises the overall efficiency of the engine as energy from the tangential flow from the leading fan is recovered by the trailing fan.

According to the above, a fan may simply be driven through the combination of coils and magnets, which are integrated into the respective fan. This concept is also suitable for two counter-rotating fans by integration of magnets into the leading fan and into the trailing fan and arranging coils in the corresponding axial positions. As both fans are driven through an own set of magnets and coils, their rotation may be initiated independently from each other. Besides the clear increase in efficiency, the weight and complexity is hardly increased, as no gearbox is necessary.

It is advantageous if the at least one fan is centerless. Due to the lack of a core engine of the engine in a base configuration, there is no further technical need to let the fan extend into the center of the engine and to integrate a shaft for the fan. Anyway, the efficiency of a fan clearly decreases from a blade tip towards the center. Therefore, a centerless configuration reduces the weight of the at least one fan substantially without compromising the possible volume flow. Instead of using a spinner attached to a center region of the at least one fan, it may be advantageous to let the center completely open and induce a center airflow through Bernoulli's principle for an efficiency increase, as described further above.

An air path in the engine according to an embodiment of the invention may be formed in a way that foreign objects follow the center airflow through the engine due to their inertia while the fan is provided with an airflow outside the center airstream in a way that the foreign objects will not hit the fan. This increases the reliability and the safety of operation as foreign objects may hardly lead to mechanical defects of the engine.

The at least one fan may be designed as one single, integrated part, which may be achieved e.g. by an additive layer manufacturing method, resulting in a sufficient rigidity especially of a delimiting strip or ring in the center region of the fan.

Still further, the pitch of the blades of the at least one fan may be adjustable. This may be advantageous for adapting the flow rate independently from the rotational speed of the fan. This may especially be necessary for better adjusting the flow-characteristics of a two-fan arrangement without requiring an adjustment of rotational speeds of the fans.

In a still further advantageous embodiment, the engine may comprise a dedicated center tube, which is attached to the cowling in a non-rotating manner. The center tube provides a predetermined flow characteristics for the center flow, which may be influenced by the diameter course from a leading region to a trailing region. For example, the diameter may be constant, continuously decreasing or may comprise a contraction like a venturi nozzle.

Consequently, it may also be advantageous to shape the dedicated center tube in a way that the center tube provides a Venturi effect to the airflow passing the center tube driven by the airflow provided by the at least one fan. The center flow supports the main air flow from the at least one fan and further increases the efficiency of the engine.

In case the engine according to an embodiment of the invention comprises a dedicated center tube, a mechanical bearing for supporting the at least one fan through the mechanical bearing at the center tube may also be possible. As the diameter of the center tube is clearly smaller than the outer diameter of the fan, the mechanical bearing at the center tube would not be as large and massive as a mechanical bearing at the outer diameter of the fan would be. Such a bearing may be maintenance-free and reliably supports the fan at all rotational speeds and loads.

Still further, the center tube may be attached to the cowling via a plurality of stator blades. Hence, an improved guidance of the airflow from the fan is possible, e.g. in order to compensate tangential flow velocity components. It goes without saying that the alignment of the stator blades is not necessarily parallel to a vertical or horizontal axis through the engine. Depending on the standard pitch of the fan blades the stator blades may also be pitched to even the air flow.

However, it may also be advantageous to support the at least one fan through a mechanical bearing at a dedicated center axis attached to the cowling via stator blades. The mechanical bearing may be even smaller than a bearing at the center tube. The axis may be arranged in the engine preferably in case no center tube is used.

Furthermore, at least one combustion engine may be integrated into the engine according to the invention. Exemplarily, this may be a ram jet, a turbojet engine, a reciprocating engine or any other engine that is capable of providing mechanical power or a thrust force through combustion of a fuel.

A ram jet is a device that relies on ram air pressure for continuously providing compressed air to a combustion chamber, downstream of which a jet stream exits, which provides an additional thrust force. The ram jet is preferably located in a center region of the engine between the at least one fan and the outlet nozzle. A great advantage of the ram jet lies in the lack of any moving component such as a compressor. It may be suitable to deactivate the fan in case the ram jet is actively operated. However, the ram jet and the at least one fan may be both active during a transition phase between fan thrust and ram jet thrust. The ram jet may be operated in cases where a large thrust force is necessary. If the ram jet and the at least one fan are operated at the same time, the airflow emanating from the at least one fan may be sufficient to provide enough ram air pressure for the ram air jet, such that the ram air jet may be operated at low velocities of the aircraft. The inlet of the engine may be adjusted in a way that the fan airflow is separatable from the ram jet airflow and/or totally closed.

In an alternative embodiment, a turbojet engine is integrated as a core engine for a thrust increase during start and climb phases. The turbojet engine may comprise its own compressor for providing compressed air to the combustion process in the core engine. This core engine may be suitable for use for increasing thrust during start and climbing phases. The turbojet engine may furthermore be mechanically couplable with the at least one fan.

The combination of a turbojet engine and the electrically driven at least one fan may lead to a hybrid engine with two independently controllable, thrust producing devices. Due to its reliability, the turbojet engine may also exclusively provide a thrust force in case the fuel cell arrangement experiences a failure. For this purpose it is conceivable to install an electrical generator into the turbojet engine, which is connectable to the electric motor driving the at least one fan. In case the turbojet engine and the fan are not connected mechanically, it is possible to completely separate the design of the fan and the turbojet engine as they are controllable to always operate at an optimal state. In case the fuel cell arrangement experiences a failure, the engine may be operated just like a conventional turbojet engine with the advantage of an independently driven fan.

It is advantageous to include a dedicated compressor ring attached to the fan for providing air to the cathode of the fuel cell arrangement. Such a compressor ring may be rigidly connected to the fan, such that it rotates with the same speed. Therefore, fan and compressor may be designed as one single part. Especially if closed cathode fuel cells are used, it is necessary to install a compressor that delivers air at a defined pressure and temperature under all environmental and flight conditions to the fuel cell arrangement. Instead of installing a separate, additional compressor with an additional electric motor, it is advantageous to combine the fan with a compressor stage that is located preferably at the blade tips of the fan in a separate ring.

Preferably, the dedicated compressor ring may be separated by an outer ring and an inner ring. These rings shall contain all necessary dynamic seals. Due to this highly integrated solution, no electric motor for the compressor is required and the air supply to the fuel cells is highly reliable and always coupled with the operation of the engine.

In another advantageous embodiment, the fuel cell arrangement is connected to an air separation module which is adapted for receiving air and providing oxygen-enriched air to a first outlet and for providing nitrogen-enriched air to a second outlet. The first outlet may thereby be connected to an oxidant inlet of the fuel cell arrangement, while the second outlet may be connectable to an inerting system of the aircraft. By using the air separation module, for example an On-Board Oxygen Generation System (OBOGS) or an On-Board Inert Gas Generation System (OBIGGS), the efficiency of the fuel cell arrangement may further be increased as the oxygen content of the air supplied to the fuel cell arrangement is increased, while the residual air contents, primarily nitrogen, is delivered to the inerting system before it reaches the fuel cell. Thereby, any residual hydrogen content may be eliminated.

For providing hydrogen to the fuel cell arrangement, the engine may comprise a hydrogen supply manifold, connectable to an on board hydrogen tank of the aircraft to be propelled. The necessary hydrogen is being stored on board of the aircraft in liquid form (LH2) at a temperature below 20 K. Before routing it into a fuel cell it is mandatory to continuously warm up the needed amount of hydrogen to a temperature which is suitable for the fuel cell arrangement, e.g. through supplying heat into the hydrogen tank, which may be accomplished by a dedicated heating unit or by the use of the liquid hydrogen as a heat sink in a controlled fashion. The hydrogen supply manifold may be realized as a pipe having a cross-section that allows a through-flow of gaseous hydrogen, wherein the pipe may have a ring-like shape for an integration upstream or downstream of the fuel cell arrangement or adjacent to the fuel cell arrangement on an inner or outer surface. Further, the hydrogen supply manifold may comprise a plurality of outlet ports, which are each associated with a fuel cell unit inside the fuel cell arrangement.

The invention further relates to an aircraft having at least one engine for providing a thrust force and at least one hydrogen tank for supplying the engine with hydrogen.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

FIG. 3a shows a third exemplary embodiment of an engine with two fans and compressor rings in a sectional view, while

DETAILED DESCRIPTION

Figure 1:
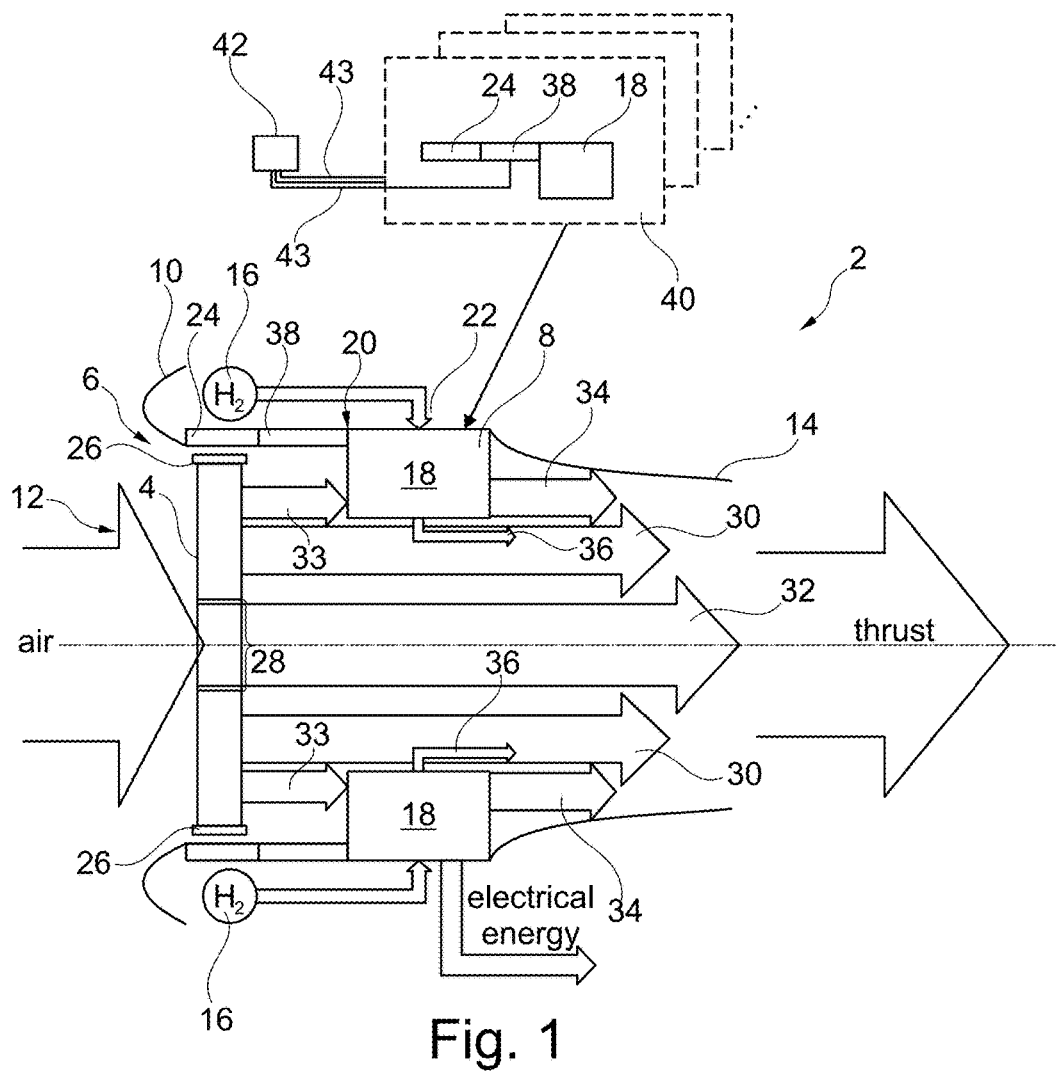
FIG. 1 shows a first exemplary embodiment of an engine with a single fan in a sectional view.

FIG. 1 shows an exemplary embodiment of an engine 2 having a fan 4, an electric motor 6, a fuel cell arrangement 8, a cowling 10 having an inlet 12 and an outlet nozzle 14 as well as a hydrogen supply manifold 16. The fuel cell arrangement 8 exemplarily comprises single fuel cell units 18, which are realized as PEM fuel cells having an open cathode and are air-cooled. The fuel cell units 18 may be arranged in a ring like manner around a longitudinal axis of the engine 2. However, the fuel cell units 18 do not need to constitute a closed ring shape, they may also be arranged at a distance to each other on a ring having a certain diameter in the cowling. The fuel cell arrangement 8 comprises a cathode side 20 as well as an anode side 22, wherein air as an oxidant is routed to the cathode side 20. Hydrogen from the hydrogen supply manifold 16 is delivered to the anode side 22. Consequently, the fuel cell arrangement 8, i.e. fuel cells or fuel cell stacks inside the fuel cell units 18, conduct a fuel cell process, in which electrical energy, heat, water and oxygen depleted air are created under consumption of hydrogen and oxygen. In the following, fuel cell related features and characteristics, i.e. electrical connections and supply of air and fuel, may also be mentioned when referring to the fuel cell arrangement as a whole.

Electrical energy is supplied to the electric motor 6, which consists of a plurality of coils 24 surrounding the fan 4 and a plurality of permanent magnets 26, movably arranged adjacent to the plurality of coils 24, located between fan 4 and coils 24 and mechanically coupled with the fan 4. The permanent magnets 26 may be integral parts of the fan 4 or may be attached to an outermost diameter of the fan 4. Hence, by suitably exciting the coils 24, the permanent magnets 26 are moved relative to the coils 24, such that a rotation of the fan 4 occurs.

Through rotation of fan 4, air is sucked from the air inlet 12 and accelerated towards the outlet nozzle 14. Due to the acceleration of the air, a thrust force is generated. The nozzle 14 may comprise a continuously decreasing cross-sectional surface area in the direction of the airflow at least in a section. It may comprise a further section with an increasing cross-sectional surface area at an outer end. Hence, the velocity of the airflow is constantly increased, which further increases the thrust force.

Exemplarily, the fan 4 is centerless, which means that it has a gap or a cut-out in a central region 28. Consequently, fan 4 produces an airflow, which is substantially annular and extends from the annular cross-sectional surface area of the fan, which spans between the innermost diameter and the outermost diameter of the fan 4, to the outlet nozzle 14 basically horizontally. In the following, this airflow is considered a main flow 30.

Due to the centerless design of the fan 4 and thanks to Bernoulli's principle, an additional air flow is sucked from the inlet 12 through the central gap or cut-out of the fan 4 into the engine 2 and constitutes a center flow 32, which exits the engine 2 through the outlet nozzle 14. The total airflow substantially equals the annular main flow 30 and the center flow 32.

Still further, driven by an outermost region of the fan 4, cathode supply air is directly supplied to the cathode side 20 of the fuel cell arrangement 8. On passing the fuel cell arrangement 8, it will be partially oxygen depleted and exits the fuel cell arrangement 8 preferably at a side facing the outlet nozzle 14. During the fuel cell process, the fuel cell arrangement 8 only consumes as much oxygen from the air flowing through it as necessary. Hence, the majority of the airflow entering the cathode simply flows through the fuel cell arrangement 8 and adds to the air flow exiting the outlet nozzle 14.

Furthermore, an additional cooling air flow 33 for cooling the fuel cell arrangement 8 may flow through the fuel cell arrangement 8 and may also be discharged into the outlet nozzle 14. This additional cooling air flow may be realized by the air supply to the cathode side 20 itself. Hence, a further fuel cell air flow 34 is added to the total flow responsible for the thrust force.

Anodes of the fuel cell arrangement 8 may periodically or continuously be purged such that periodically or continuously an anode purge flow 36 adds to the total air flow. Purging means, that a portion of anode outlet gas is purged to the exhaust, which helps preventing a buildup of contaminations or impurities on the anode. Altogether, this leads to extending the useable life of the fuel cell arrangement 8.

The hydrogen supply manifold 16 may be a tubular device having a hydrogen inlet and a plurality of hydrogen outlets, which may be realized by a plurality of ports distributed over the outer surface of the hydrogen supply manifold 16 and connected to the fuel cells units, fuel cells or fuel cell stacks of the fuel cell arrangement 8.

It is preferred to use a plurality of inverters 38 for providing a suitable voltage and current to the coils 24 of the electric motor 6, based on an output voltage and a providable current from the fuel cell arrangement 8. For connecting the inverters 38 to the fuel cell arrangement 8, plugs and sockets may be used. In a preferred exemplary embodiment, several fuel cell units 18 are each connected to an inverter 38, which in turn is connected to a coil 24. This arrangement may be constituting a module 40, wherein each inverter 38 may be connectable to a control unit 42. Electrical connections may be provided through direct contacts between the fuel cell arrangement 8, the inverters 38 and between the inverters 38 and the coils 24 as well as an additional ground line connectable to all of these components.

The control unit 42 may be responsible for controlling the inverters 38, such that they provide suitable individual voltages to the coils 24, thereby leading to a desired rotational speed of the fan 4. This may be achieved through a plurality of control lines 43. The control unit 42 may in turn be connectable to a flight control system of the aircraft to be propelled.

In this exemplary embodiment, the fan 4 is supported through a magnetic bearing, which is realized through the combination of coils 24 and magnets 26. The coils 24, controlled by the control unit 42 or another, not shown, dedicated bearing control unit, aim to maintain a predetermined gap between the magnets 26 and the coils 24. As the whole circumference of the fan 4 is surrounded by the magnets 26, two opposing magnets 26 may be attracted to their respective coils 24, such that the gap on both sides does not fall below a predetermined minimum. It goes without saying, that all other coils 24 and magnets 26 conduct this gap control. Through dedicated gap sensors distributed around the circumference of the fan 4, individual gaps over the whole circumference of the fan 4 may be controlled. Additionally, the axial thrust force is transferred into the structure of the engine and the fuselage.

Figure 2:
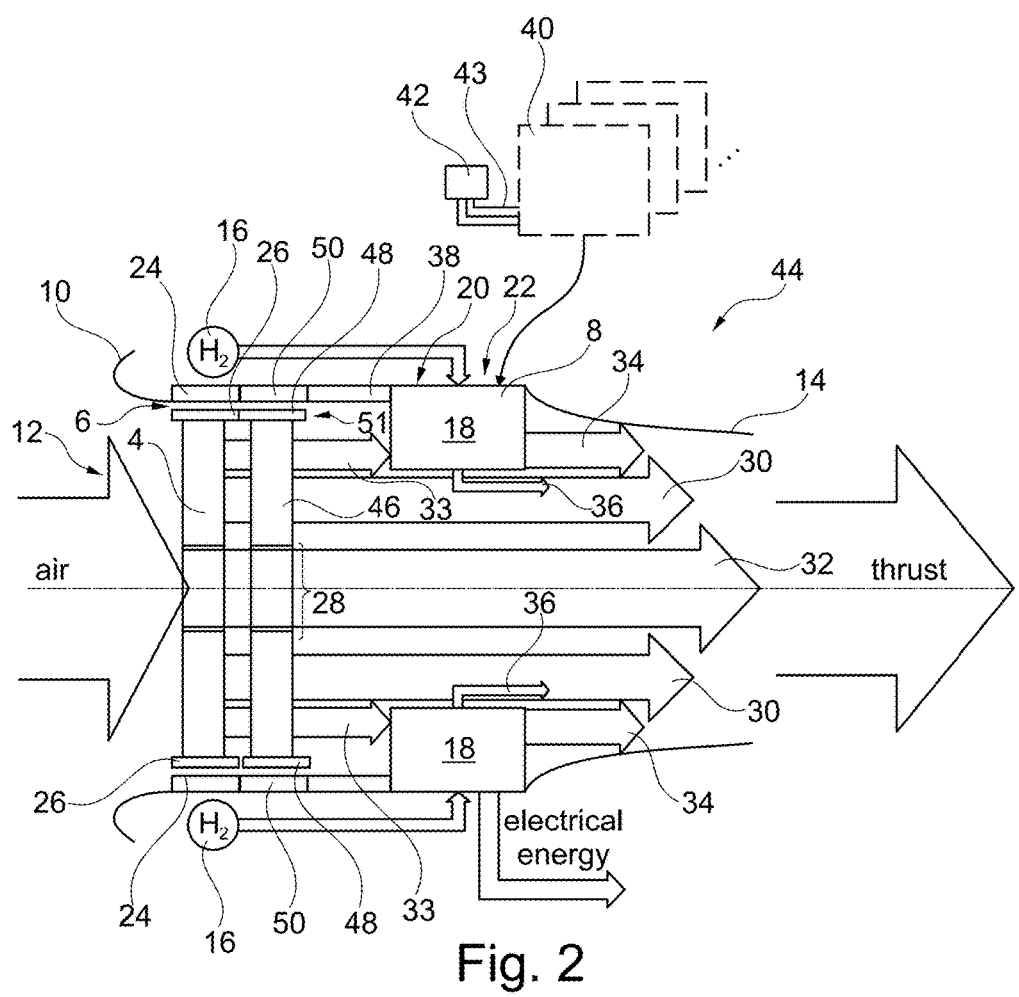
FIG. 2 shows a second exemplary embodiment of an engine with two fans in a sectional view.

In FIG. 2, another exemplary embodiment, i.e. an engine 44, is shown, which distinguishes from engine 2 of FIG. 1 especially through the use of a second fan 46 downstream of the fan 4. In the following, the fan 4 located upstream of the second fan 46 is named "first fan" 4 or "leading fan" 4. The second fan 46 is the "trailing fan" 46. In analogy to the setup of the first fan 4, the second fan 46 is mechanically coupled with additional magnets 48, which are associated to additional coils 50 surrounding the second fan 46. Consequently, the second fan 46 may be driven independently from the first fan 4 through a second electric motor 51.

It is desirable to counter-rotate the first fan 4 and the second fan 46 for reducing the resulting reaction torque of the engine 44, which acts on engine support means. Further, usually an arrangement of two counter-rotating fans may clearly increase the efficiency compared to the use of a single fan with the same air volume flow or two separate, parallel arranged fans.

In this exemplary embodiment, both the first fan 4 and the second fan 48 are supported through a magnetic bearing created by the combination of magnets 26, 48 and the associated coils 24 and 50. As the fans 4 and 46 are completely independent, both require an individual bearing control through dedicated bearing control units (not shown) or the control unit 42, associated with a plurality of gap sensors.

Figure 3A:
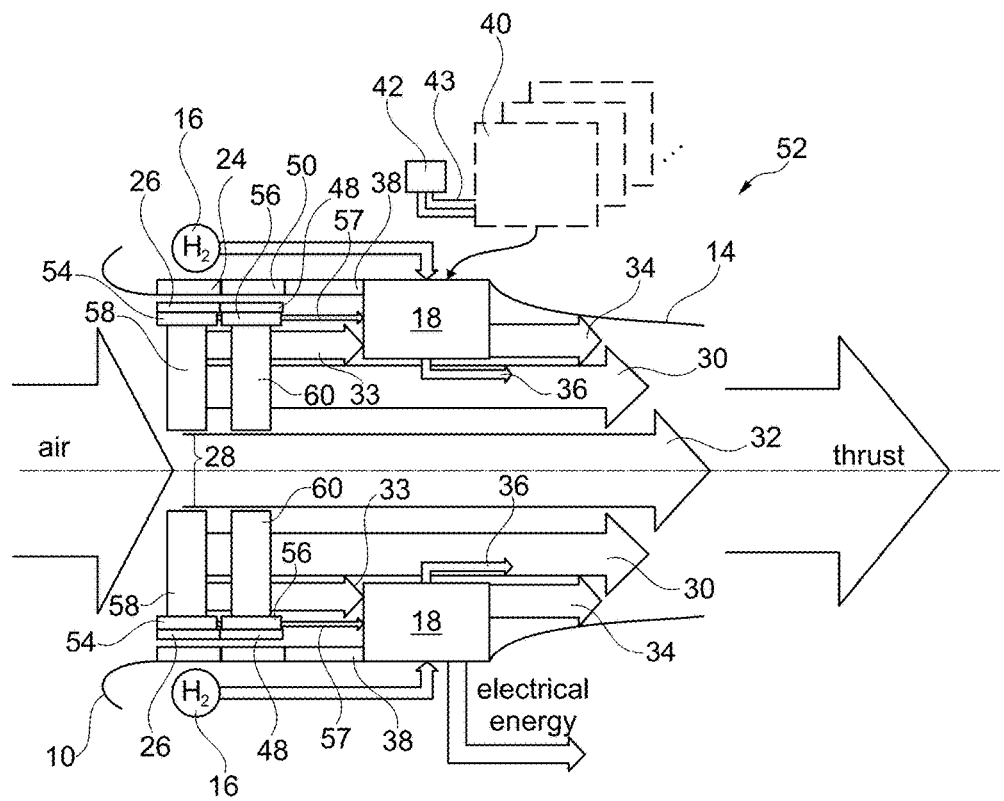
Figure 3B:
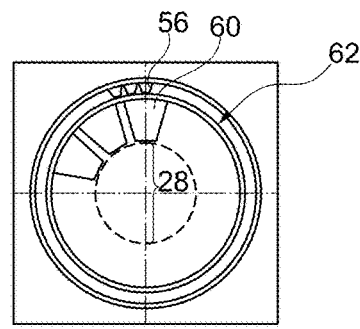
FIG. 3b shows a detailed view of a fan with a compressor ring.

FIG. 3a shows an engine 52, which distinguishes from the engine 44 of FIG. 2 in that compressor rings 54 and 56, i.e. ring shaped compressors, are used, while basically all other components remain unchanged. These are situated in an outermost region of an associated first fan 58 or a second fan 60 as indicated in a front view onto an inlet side of the engine 52 in FIG. 3b.

These compressor rings 54 and 56 are useful for delivering an adequate air flow 57 for providing oxygen to the fuel cell arrangement 8 especially on cruise level. Exemplarily, blades of the second fan 60 and blades of the compressor ring 56 are shown, wherein the fan blades and the compressor blades are exemplarily separated through a rigid ring 62. The use of one of the compressor rings, e.g. compressor ring 54, for an engine 2 shown in FIG. 2, is explicitly possible and the scope of protection defined herein is not limited to the use of compressor rings for engines with two fans.

Figure 4:
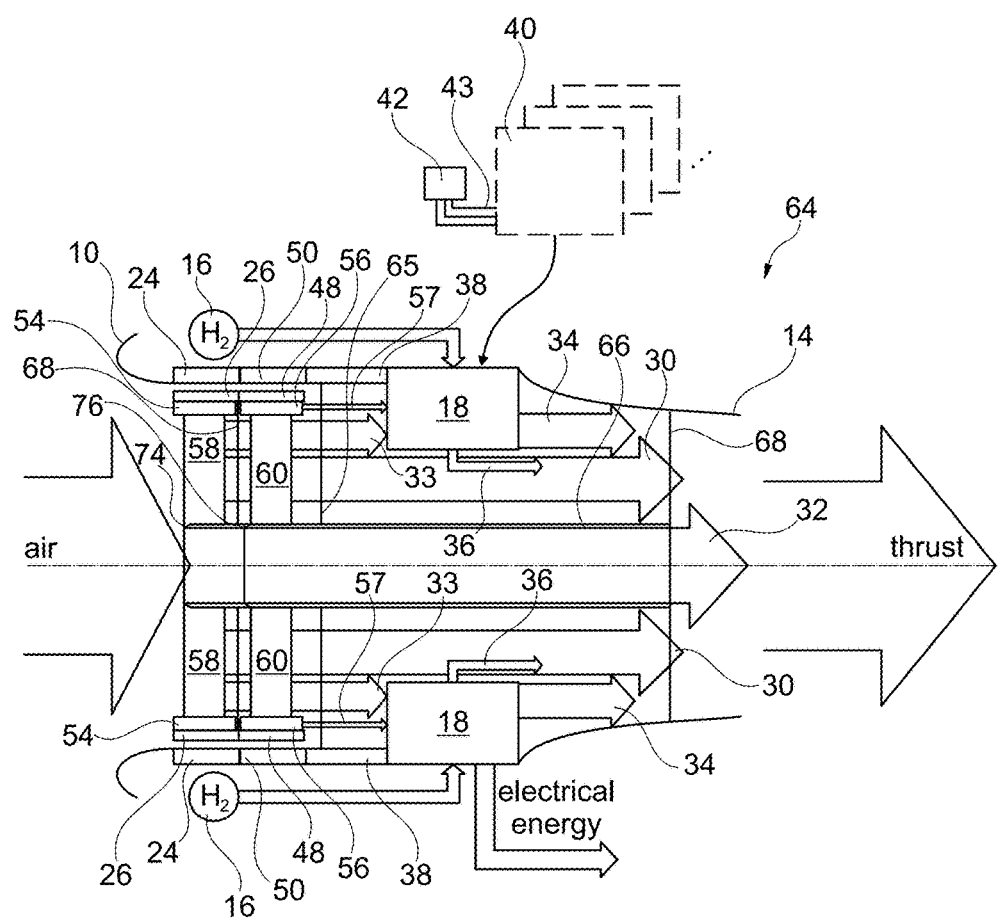
FIG. 4 shows a fourth exemplary embodiment of an engine with two fans and a dedicated center tube in a sectional view.

In FIG. 4, an engine 64 is depicted, which is based on engine 52 shown in FIG. 3 and comprises a center tube 66, which is supported inside the cowling 10 through a plurality of preferably evenly distributed stators 68, which extend from the center tube 66 to the cowling in a radial manner. Consequently, a first fan 70 and a second fan 72 may be supported by mechanical bearings 74 and 76 on an outer diameter of the center tube 66. The mechanical bearings may be ball bearings or hydro dynamic glide bearings. In this case, the electric motors constituted by magnets 26 and 48 as well as coils 24 and 50 are not responsible for supporting the fans 70 and 72. The feature of a dedicated center tube 66 may also be applied to any other of the engines 2 or 44 as well as to the engines described further below, with or without the use of mechanical bearings 74 and 76 for at least one fan.

Figure 5:
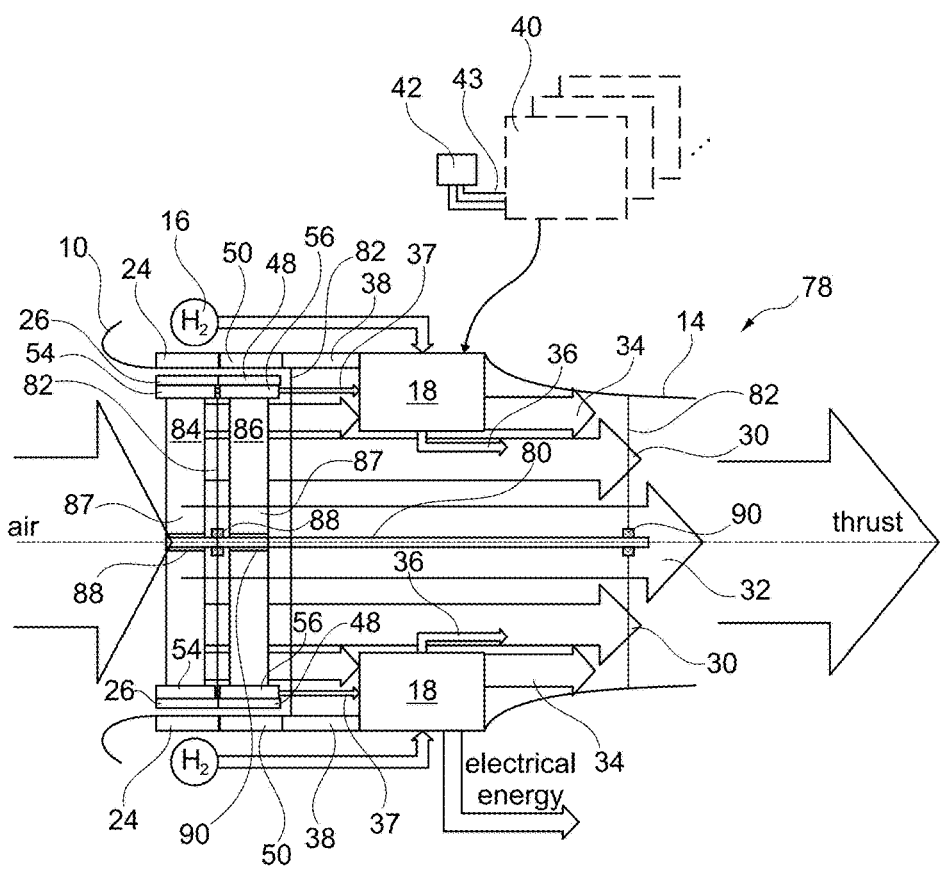
FIG. 5 shows a fifth exemplary embodiment of an engine with two fans and a center axis in a sectional view.

Further, FIG. 5 shows an engine 78, which is based on engine 52 shown in FIG. 3 and additionally comprises a rotatably supported central axis 80, which is supported through radial stators 82 fixed on an inside of the cowling 10 and associated bearings 88 and 90. This allows to support a first fan 84 and a second fan 86 on the central axis 80 in a rotatable manner. Fastening means 87 may extend from the axis 80 to the inner diameters of the fans 84 and 86, wherein the fastening means 87 may be rods, a grids or any other means that allows to support the inner diameter of the fans 84 and 86 on the axis. Due to the support on the central axis 80, the outer radius of the mechanical bearings may be as small as possible, such that the weight and complexity of the mechanical bearings is very low. Further, this bearing concept may be applied to all other engines 2 or 44 as well as to the engines described further below. Also, the central axis 80 may be supported in a dedicated center tube 66 of the engine 64 in FIG. 4. It goes without saying that the axis may be held in a non-rotatable fashion, while the fans 84 and 86 are rotatably supported relative to the axis 80.

Figure 6:
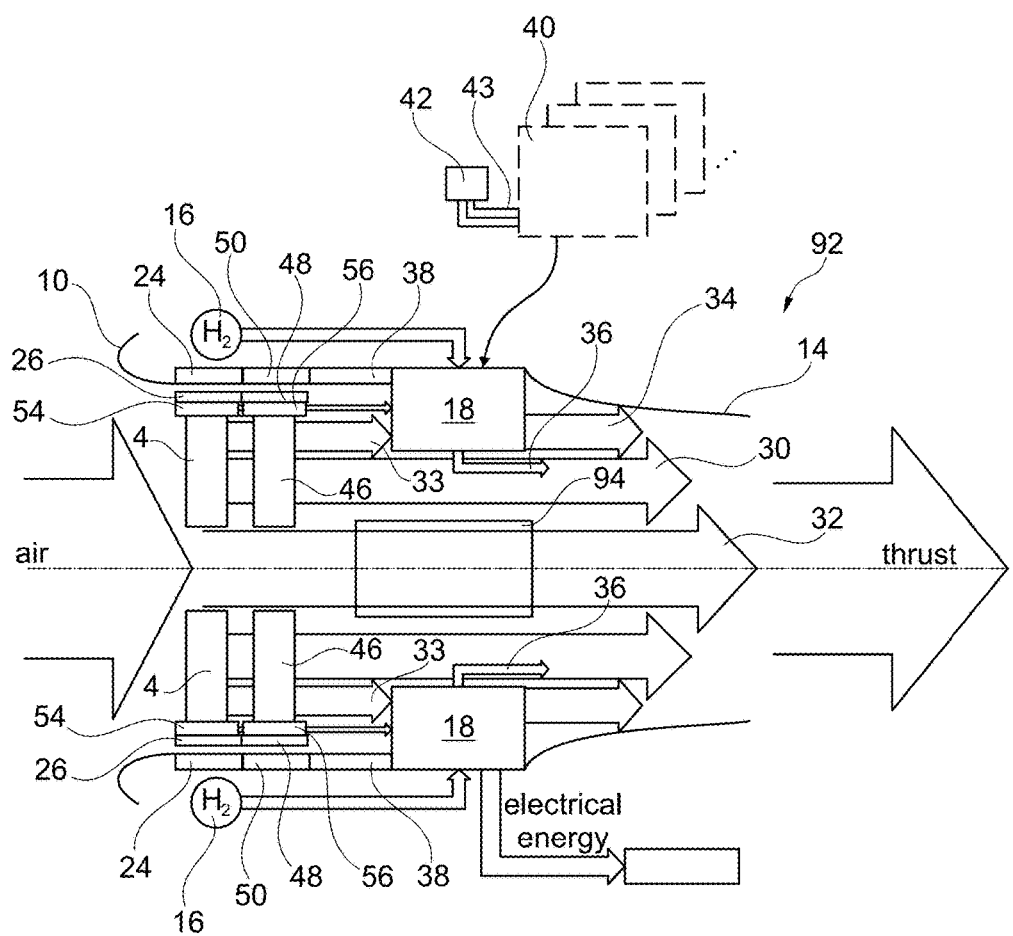
FIG. 6 shows a sixth exemplary embodiment of an engine with two fans and a combustion engine in a sectional view.

Still further, FIG. 6 shows an engine 92, based on engine 52 shown in FIG. 3 and comprising a combustion engine 94 in a center region. This combustion engine 94 provides a flow of gas emanating from a combustion process inside the combustion engine 94, which may be driven through the supply of hydrogen and air, or alternatively through a dedicated combustion engine fuel, such as kerosene. The combustion engine 94 may be a ram jet or a turbojet engine. The combustion engine may be operated in phases, where an increased demand of thrust exists, such as during start or climbing.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An engine for propelling an aircraft, comprising:
a fuel cell arrangement having at least one fuel cell unit;
at least one electric motor couplable to the fuel cell arrangement;
at least one first fan couplable to the at least one electric motor; and
an outermost cowling having an inlet and an outlet nozzle,
wherein the fuel cell arrangement is positioned at an inner surface of the outermost cowling, said inner surface of the outermost cowling defining a flow duct of the at least one first fan,
said fuel cell arrangement configured to receive a portion of an airflow generated by the at least one first fan in said flow duct,
wherein the at least one first fan is arranged between the inlet and the fuel cell arrangement inside the outermost cowling,
wherein the at least one electric motor is operable under consumption of electric power delivered by the fuel cell arrangement, and
wherein the at least one first fan is configured to produce a thrust force by creating an accelerated airflow at the outlet nozzle.

2. The engine of claim 1, wherein the fuel cell arrangement comprises a plurality of fuel cell units arranged annularly within the outermost cowling.

3. The engine of claim 2, wherein the at least one electric motor comprises a plurality of coils fixedly arranged inside the outermost cowling and a plurality of magnets mechanically coupled with the at least one first fan.

4. The engine of claim 3, wherein each coil of the plurality of coils is coupled with at least one electrical inverter,
wherein the at least one electrical inverter is coupled with the fuel cell arrangement and is controllable by a control unit.

5. The engine of claim 4, wherein the at least one electrical inverter is arranged in an annular arrangement between the inlet and the fuel cell arrangement.

6. The engine of claim 4, wherein the fuel cell arrangement comprises the plurality of fuel cell units being arranged annularly within the outermost cowling, and
   wherein each fuel cell unit of the plurality of fuel cell units is coupled with the at least one electrical inverter.

7. The engine of claim 6, wherein each fuel cell unit of the plurality of fuel cell units is mechanically and electrically coupled with the at least one electrical inverter without using an electric cable.

8. The engine of claim 3, further comprising a magnetic bearing between the at least one first fan and the outermost cowling for rotatably supporting the at least one first fan, and
   wherein the plurality of coils and the plurality of magnets provide the magnetic bearing.

9. The engine of claim 1, further comprising a magnetic bearing between the at least one first fan and the outermost cowling for rotatably supporting the at least one first fan.

10. The engine of claim 1, wherein the at least one fuel cell is one of a PEM (Proton Exchange Membrane) fuel cell and a closed cathode PEM fuel cell.

11. The engine of claim 1, further comprising an exhaust gas recirculation outlet and a recirculation line,
   wherein the recirculation line is connected with a fuel cell exhaust gas outlet and with the recirculation outlet, and
   wherein the exhaust gas recirculation outlet is arranged upstream of the fuel cell arrangement.

12. The engine of claim 1, further comprising a second fan, and a second electric motor,
   wherein the at least one first and second fans are arranged one behind another in an axial direction and
   wherein the at least one electric motor and the second electric motor are adapted for counter-rotating the at least first and second fans.

13. The engine of claim 1, wherein the at least first fan is centerless.

14. The engine of claim 1, further comprising a combustion engine.

15. The engine of claim 1, wherein the outermost cowling encloses all active components of the at least one engine.

16. An aircraft, comprising at least one engine and at least one hydrogen tank for supplying the at least one engine with hydrogen, the at least one engine comprising:
   a fuel cell arrangement having at least one fuel cell unit;
   at least one electric motor couplable to the fuel cell arrangement;
   at least one first fan couplable to the at least one electric motor; and
   an outermost cowling having an inlet and an outlet nozzle,
   wherein the fuel cell arrangement is positioned at an inner surface of the outermost cowling, said inner surface defining a flow duct of the at least one first fan,
   said fuel cell arrangement configured to receive a portion of an airflow generated by the at least one first fan in said flow duct,
   wherein the at least one first fan is arranged between the inlet and the fuel cell arrangement inside the outermost cowling,
   wherein the at least one electric motor is operable under consumption of electric power delivered by the fuel cell arrangement, and
   wherein the at least one first fan is configured to produce a thrust force by creating an accelerated airflow at the outlet nozzle.

\* \* \* \* \*